April 21, 1936.  C. R. McMEEKAN  2,038,438
HARROW
Filed June 4, 1935  2 Sheets-Sheet 1
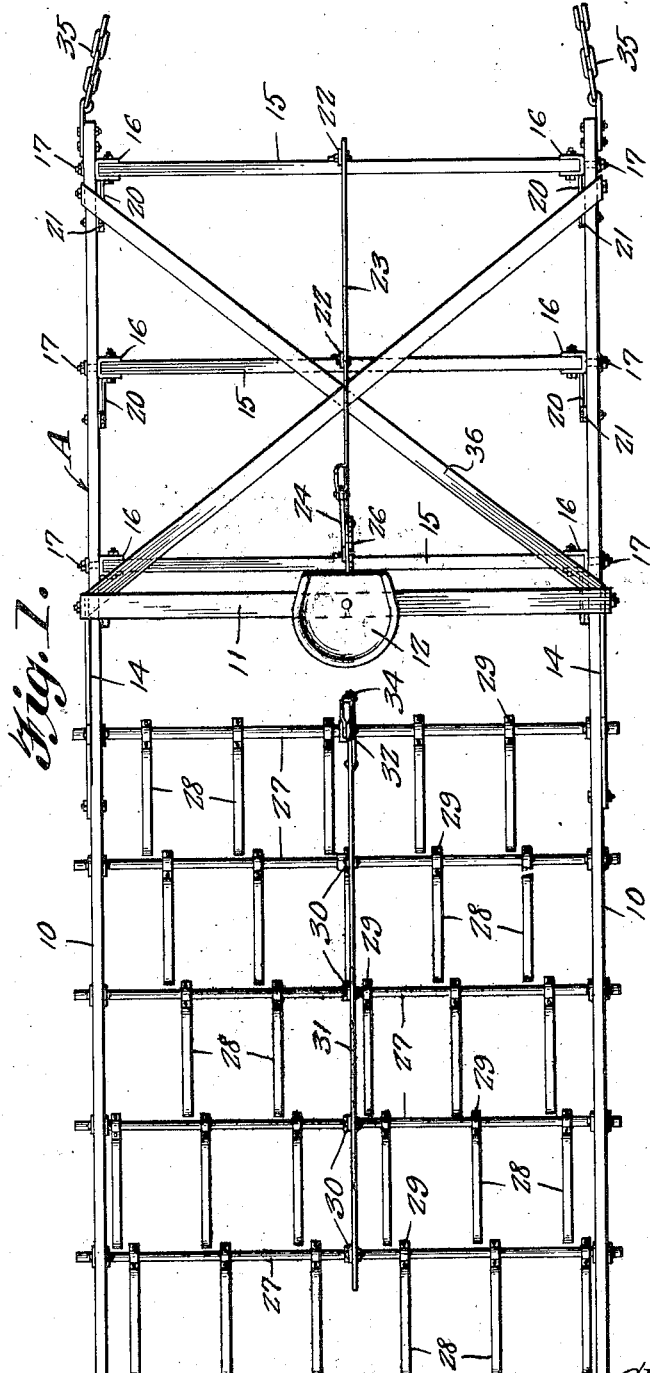
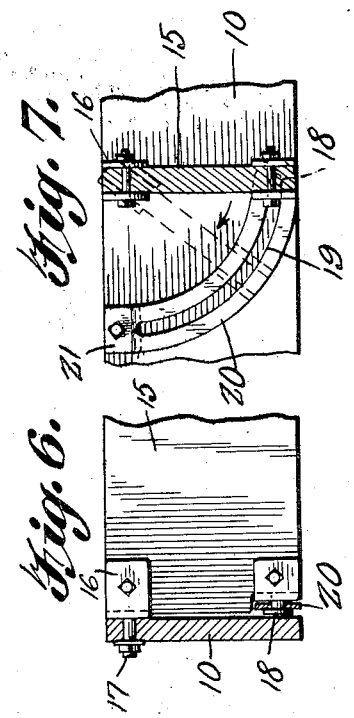
Clarence R. McMeekan, INVENTOR
BY Victor J. Evans & Co. ATTORNEY April 21, 1936.  C. R. McMEEKAN  2,038,438
HARROW
Filed June 4, 1935    2 Sheets-Sheet 2
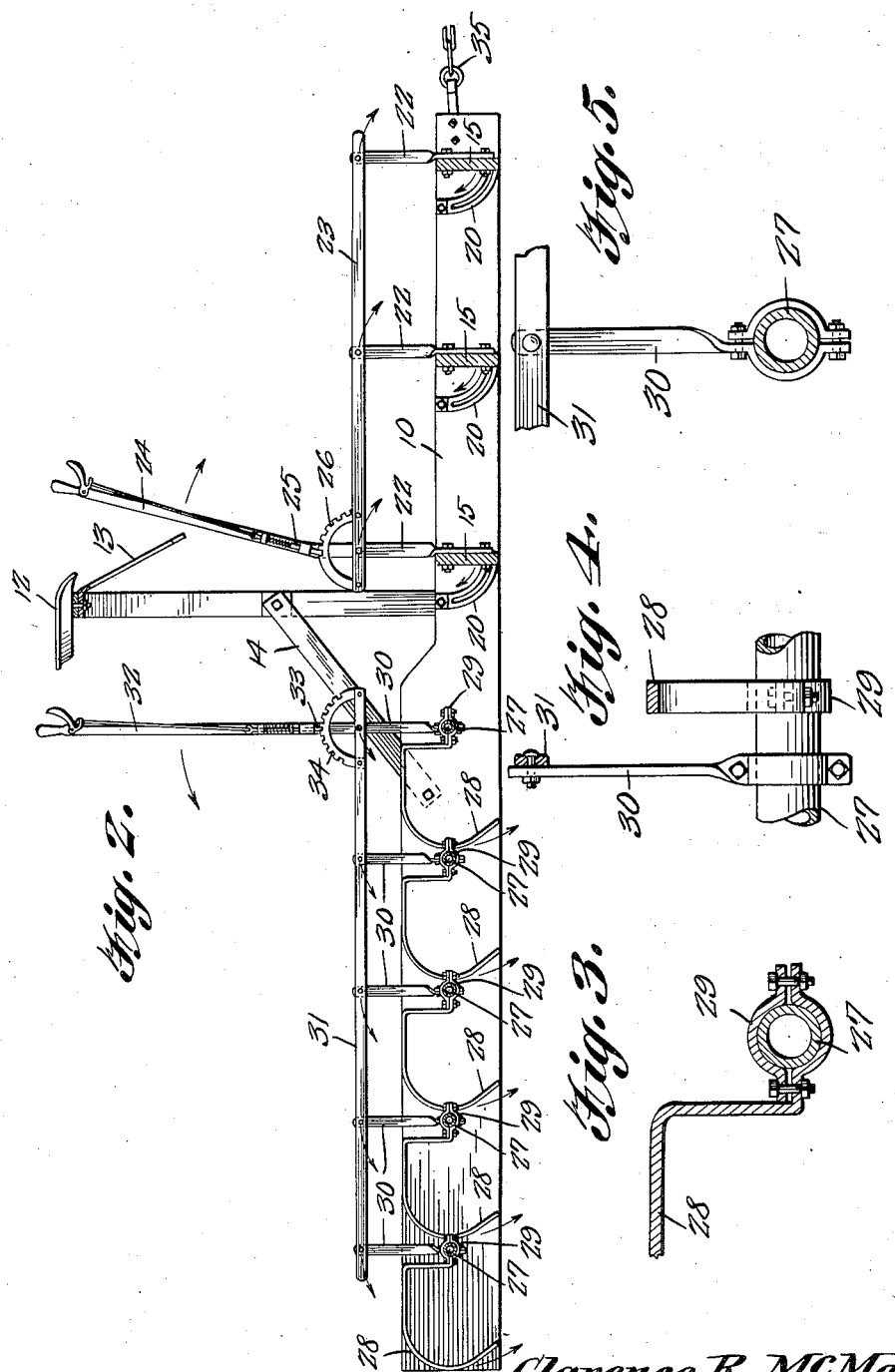
Clarence R. McMeekan,
INVENTOR
BY Victor J. Evans & Co.
ATTORNEY Patented Apr. 21, 1936

2,038,438

UNITED STATES PATENT OFFICE 2,038,438

HARROW

Clarence R. McMeekan, Hennessey, Okla.

Application June 4, 1935, Serial No. 24,927

4 Claims. (Cl. 55—23)

The invention relates to a harrow and more especially to a combined harrow and leveler.

The primary object of the invention is the provision of an implement of this character, wherein in the use thereof a ground area will be harrowed and leveled in a single operation of the machine, the leveling bars or blades being readily adjustable to vary the leveling action on the harrowed ground and also the drag teeth of the harrow can be adjustable in unison to vary the action thereof during the harrowing period.

Another object of the invention is the provision of an implement of this character, wherein the blades and teeth are especially adaptable for the preparing of the ground for the raising of wheat, the ground being acted upon for the harrowing and packing thereof so that a perfect seed bed will be assured.

A further object of the invention is the provision of an implement of this character, which is comparatively simple in construction, compact, thoroughly reliable and efficient in its operation, readily and easily handled and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a top plan view of a machine constructed in accordance with the invention.

Figure 2 is a vertical longitudinal sectional view thereof.

Figure 3 is a fragmentary detailed vertical sectional view showing the mounting of one of the harrow teeth.

Figure 4 is a fragmentary front elevation partly in section of the same.

Figure 5 is a side view thereof.

Figure 6 is a fragmentary vertical sectional view showing one of the leveling blades in elevation.

Figure 7 is a fragmentary vertical sectional view through one of the blades showing by full lines the same in one position and by dotted lines in an adjusted position.

Similar reference characters indicate corresponding parts throughout the several views in the drawings.

Referring to the drawings in detail, the machine or implement comprises a drag frame A including spaced parallel side runners 10 having fixed thereto intermediate of said frame a bridge 11 for a seat 12 and connected with this bridge fore thereof are the front braces 13 which are joined with the runners 10 while aft thereof and connected thereto are the rear braces 14, these being also connected with said runners 10.

Located between the runners 10 at the fore portion thereof are drag blades 15, these being spaced apart with relation to each other and disposed transversely of said frame A. Each blade 15 at the upper opposite corners thereof has fitting with pivot brackets 16, their pivots 17 being journaled in the runners 10 so that each blade is capable of vertical swinging movement. At the lower corners of each blade 15 are the guide studs 18 engaging in slots 19 provided in arcuate shaped guide members 20 each having the offset hanger end 21 which is bolted or otherwise secured to its companion runner 10.

Secured to the blades 15 intermediate thereof are the actuator levers 22 having pivoted thereto a shift rod 23 and the lever 22 next to the seat 12 is formed with a throw arm 24 carrying a spring set manually released latch 25 engageable with a segmental tooth rack or keeper 26 fitted with the rod 23. Thus it will be seen that when the arm 24 is released and moved the blades 15 in unison can be thrown to the desired adjusted position and maintained fast in such position by the latch 25 engaging the keeper 26.

Aft of the frame A are the harrow equipment rocker shafts 27, these being journaled in the runners 10 transversely of said frame. Carried upon the shafts 27 are the harrow teeth 28 each being made fast to its companion shaft by a clamp 29. The harrow teeth 28 are of the desired shape as shown in Figure 2 of the drawings. Secured to the shafts 27 are upstanding throw levers 30 to which is pivoted the throw rod 31 and the lever 30 next to the seat 12 has formed therewith an actuator arm 32 carrying the spring set manually releasable latch 33 engageable with a segmental tooth rack or keeper 34 secured upon the rod 31. Thus it will be seen that when the arm 32 is moved the harrow teeth 28 can be adjusted for regulating the working of the soil or ground in the draft of the machine.

The front end of the frame A carries a hitch 35 for the draft of the machine and such machine can be horse driven or traction pulled.

In the forward draft of the machine the drag blades 15 level the ground surface and simultaneously therewith and following the leveling operation the harrow teeth 28 will harrow the leveled soil so that in a single operation combined leveling and harrowing may be had of the soil for preparing a seed bed, particularly a wheat bed. Crossing between the middle blade 15 and the rod 23 and suitably carried by the runners 10 are braces 36.

What is claimed is:

1. A machine of the character described, comprising a drag frame having side runners, drag blades adjustably mounted between the runners fore of the frame, adjustable harrow teeth mounted aft of said frame between the runners, a bridge in the frame and carried by the runners, a seat on said bridge, and mechanism close to the seat for adjusting the drag blades and harrow teeth.

2. A machine of the character described, comprising a drag frame having side runners, drag blades adjustably mounted between the runners fore of the frame, adjustable harrow teeth mounted aft of said frame between the runners, a bridge in the frame and carried by the runners, a seat on said bridge, and mechanism close to the seat for adjusting the drag blades and harrow teeth independently of each other.

3. A machine of the character described, comprising a drag frame having side runners, drag blades adjustably mounted between the runners fore of the frame, adjustable harrow teeth mounted aft of said frame between the runners, a bridge in the frame and carried by the runners, a seat on said bridge, mechanism close to the seat for adjusting the drag blades and harrow teeth independently of each other, pivot brackets swingingly mounting the blades between the runners, slotted guide pieces carried by the runners, and guides on the blades and engaging the slotted guide pieces.

4. A machine of the character described, comprising a drag frame having side runners, drag blades adjustably mounted between the runners fore of the frame, adjustable harrow teeth mounted aft of said frame between the runners, a bridge in the frame and carried by the runners, a seat on said bridge, mechanism close to the seat for adjusting the drag blades and harrow teeth independently of each other, pivot brackets swingingly mounting the blades between the runners, slotted guide pieces carried by the runners, guides on the blades and engaging the slotted guide pieces and rocking shafts pivoted in the runners and having the harrow teeth clamped therewith.

CLARENCE R. McMEEKAN.